US006494280B1

(12) United States Patent
Friend et al.

(10) Patent No.: US 6,494,280 B1
(45) Date of Patent: Dec. 17, 2002

(54) TELESCOPING TORSION BAR VEHICLE HOOD ASSIST SYSTEM

(75) Inventors: Rusty O. Friend, Fort Wayne, IN (US); John P. Mackoway, III, Fort Wayne, IN (US); Peter J. Voors, Fort Wayne, IN (US)

(73) Assignee: International Truck Intellectual Property Company, L.L.C., Warrenville, IL (US)

( * ) Notice: Subject to any disclaimer, the term of this patent is extended or adjusted under 35 U.S.C. 154(b) by 0 days.

(21) Appl. No.: 09/648,031

(22) Filed: Aug. 25, 2000

(Under 37 CFR 1.47)

Related U.S. Application Data

(60) Provisional application No. 60/151,269, filed on Aug. 27, 1999.

(51) Int. Cl.[7] .................................... B62D 25/12

(52) U.S. Cl. ................ 180/69.2; 180/69.21; 180/89.17; 49/386; 16/308; 16/360

(58) Field of Search ............................ 180/69.2, 69.21, 180/89.17, 89.15; 49/381, 386, 387; 16/277, 308, 360, 357, 75; 267/154

(56) References Cited

U.S. PATENT DOCUMENTS

| | | | | | |
|---|---|---|---|---|---|
| 2,894,277 | A | * | 7/1959 | Bogater et al. | 16/298 |
| 3,339,969 | A | | 9/1967 | Bridle et al. | |
| 3,438,152 | A | | 4/1969 | Cadiou | |
| 4,291,501 | A | * | 9/1981 | Steinberg et al. | 16/308 |
| 4,402,111 | A | * | 9/1983 | Selby et al. | 16/308 |
| 4,949,426 | A | | 8/1990 | Komaki | |
| 5,101,921 | A | * | 4/1992 | West et al. | 16/370 |
| 5,730,239 | A | | 3/1998 | Holter | |
| 5,988,724 | A | * | 11/1999 | Wolda | 16/308 |
| 6,070,929 | A | * | 6/2000 | Barkley | 16/75 |

FOREIGN PATENT DOCUMENTS

| | | |
|---|---|---|
| DE | 3542686 | 7/1987 |
| FR | 1425928 | 4/1966 |
| GB | 1270517 | 4/1972 |

* cited by examiner

*Primary Examiner*—F. Zeender
(74) *Attorney, Agent, or Firm*—Jeffrey P. Calfa; Neil T. Powell; Dennis Kelly Sullivan

(57) ABSTRACT

A torsion bar hood assist system for a vehicle which has a hood that pivots between an open and a closed position. The hood assist system includes a compact torsion mechanism with at least two torsion bar sections. The torsion mechanism of the hood assist system is mounted distant from a pivot axis of the hood. The torsion mechanism is engaged to the vehicle in a manner which allows the torsion mechanism to be mounted distant from the hood pivot axis and reduces the stresses imparted to the torsion mechanism when the hood is pivoted.

20 Claims, 18 Drawing Sheets

FRONT OF VEHICLE

FIG. 6A
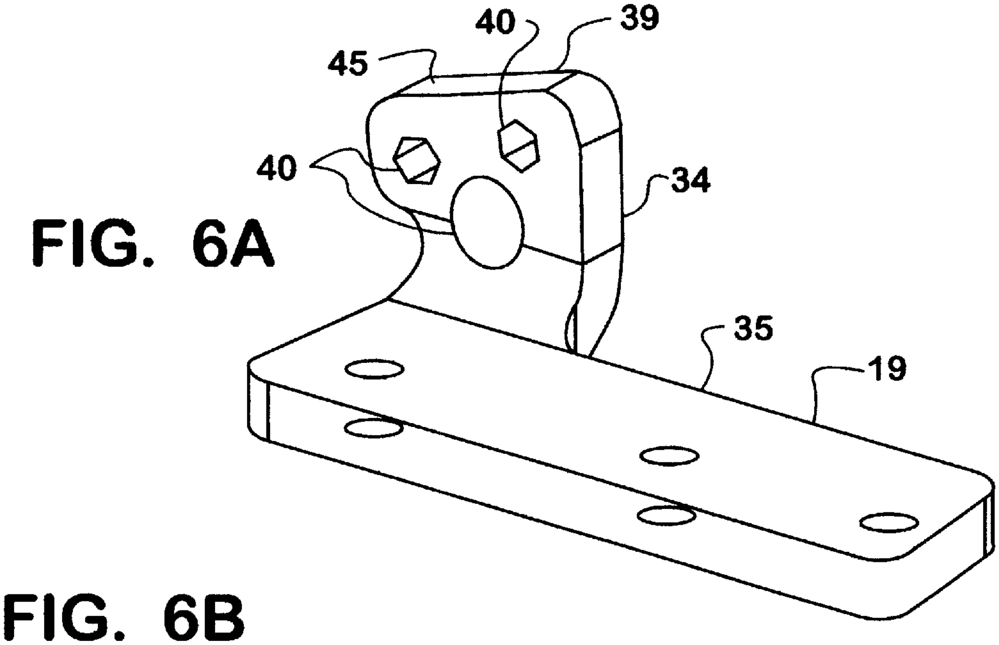
FIG. 6B
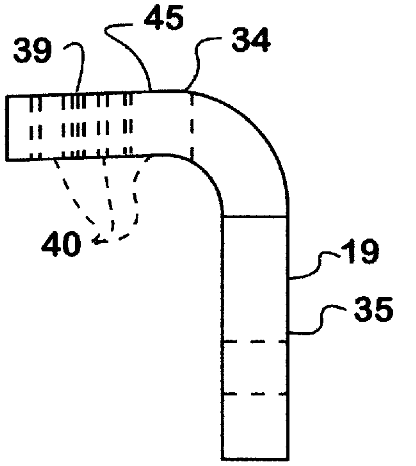
FIG. 6C
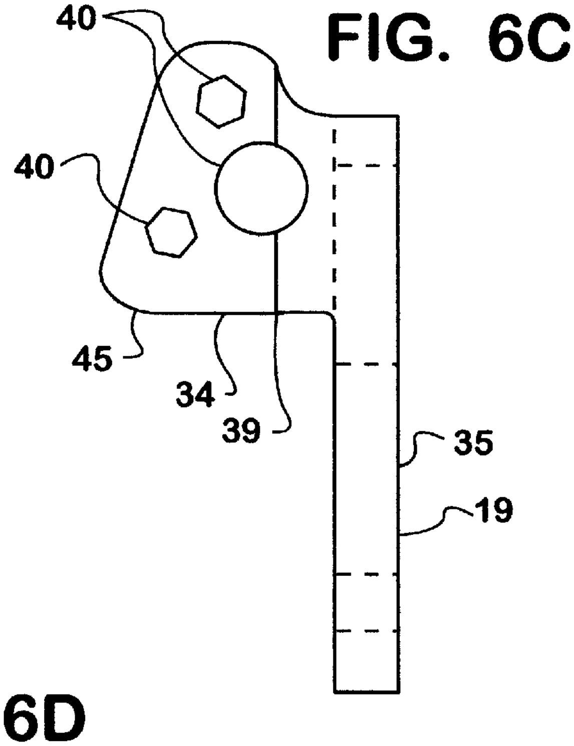
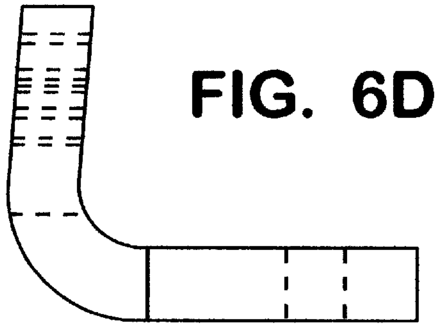
FIG. 6D

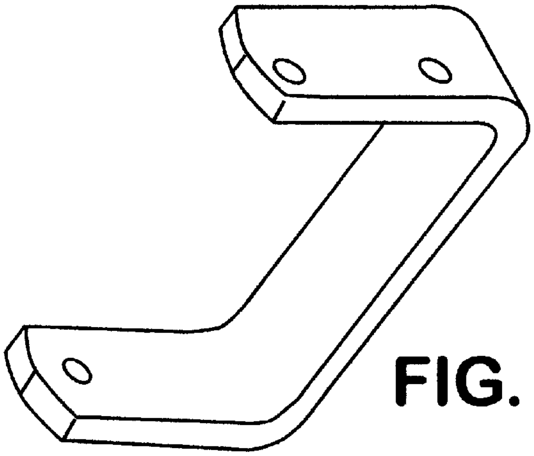
FIG. 7D
FIG. 7A
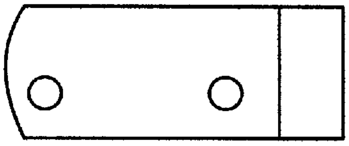
FIG. 7B
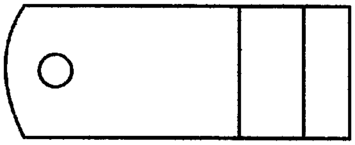
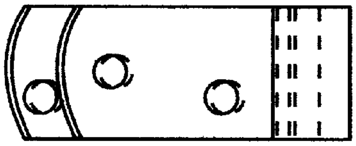
FIG. 7E
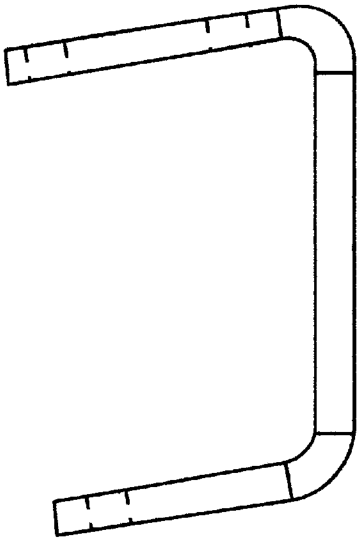
FIG. 7F
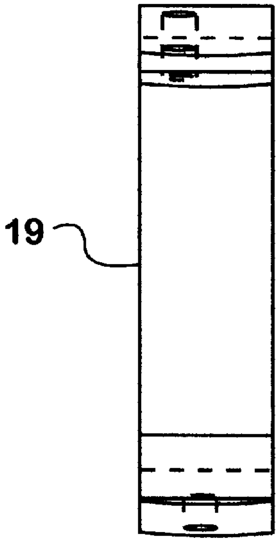
FIG. 7C FIG. 8B
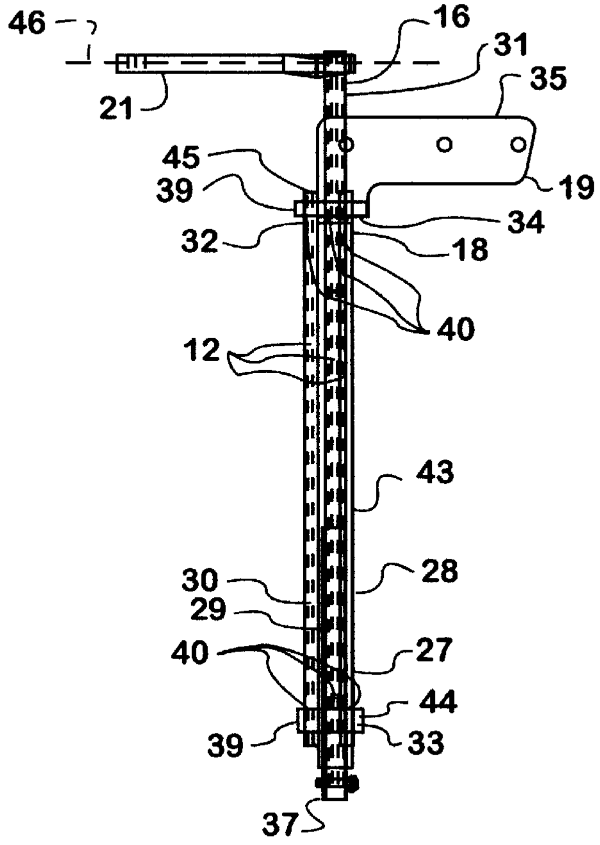
FIG. 8A
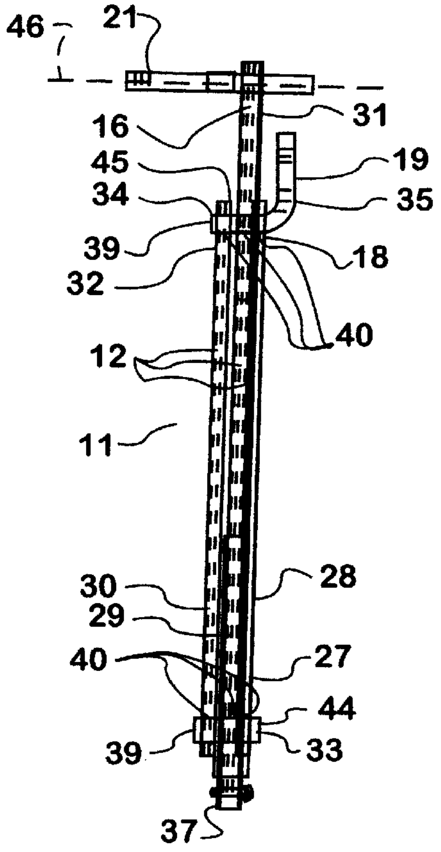
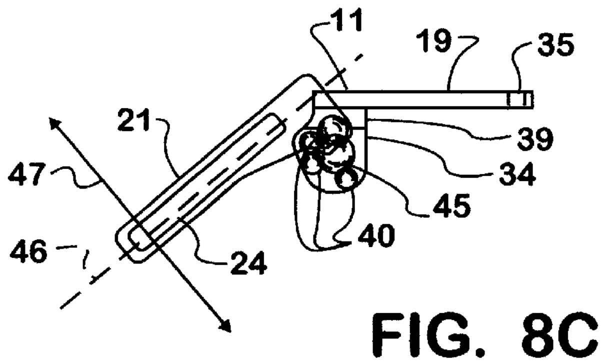
FIG. 8C FIG 10A
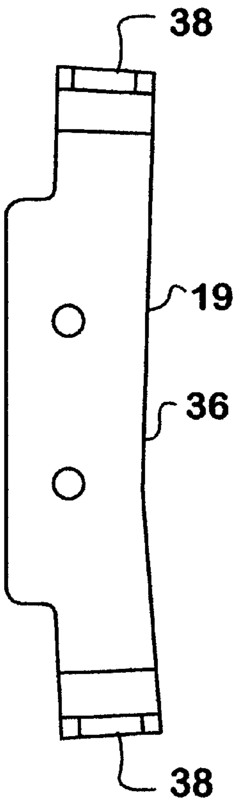
FIG 10B
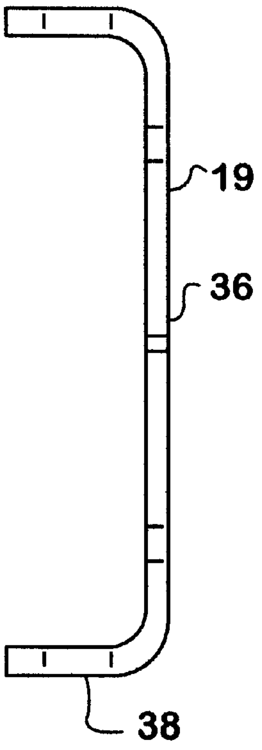
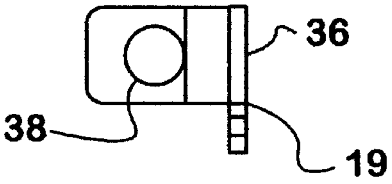
FIG 10C
FIG 10D
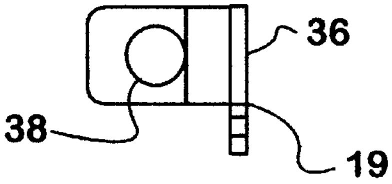

FIG. 11A
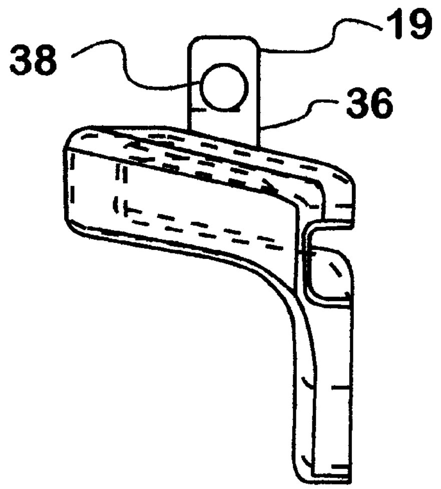
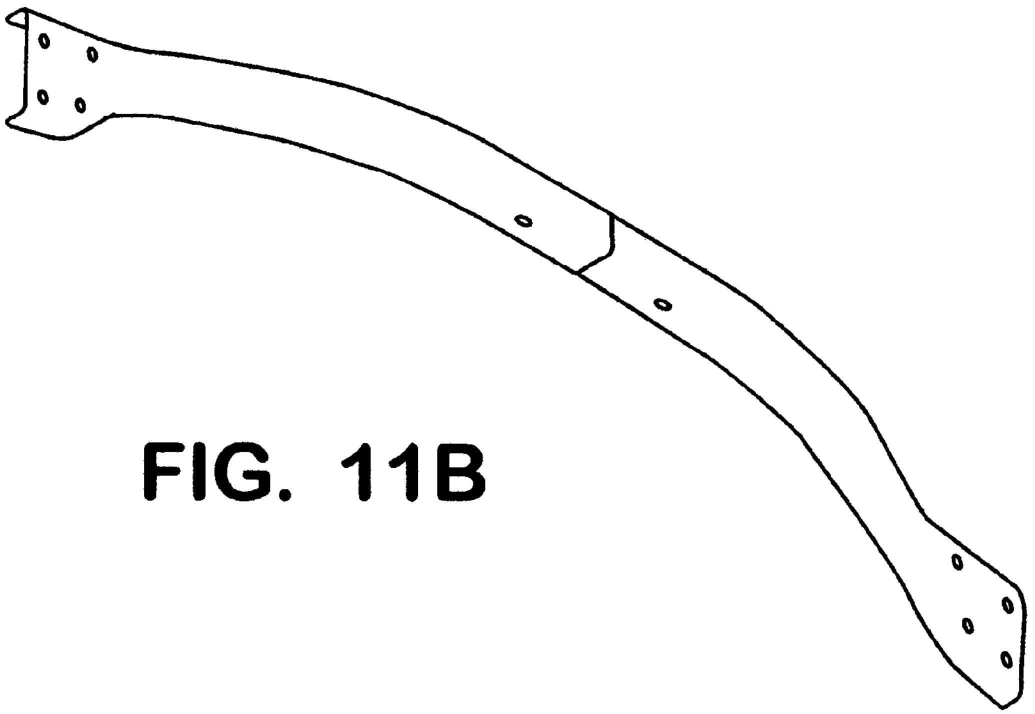
FIG. 11B

FIG. 13A
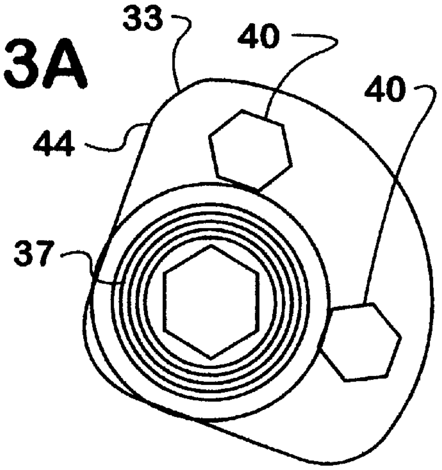
FIG. 13B
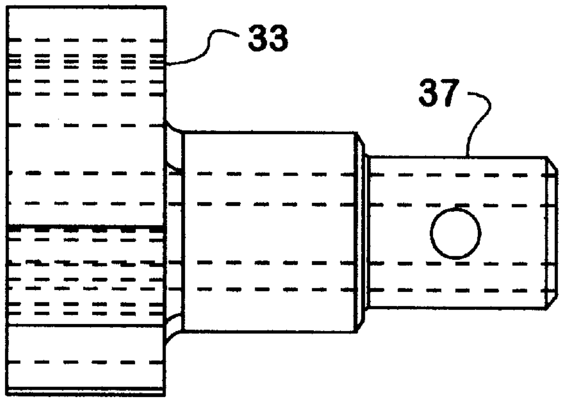
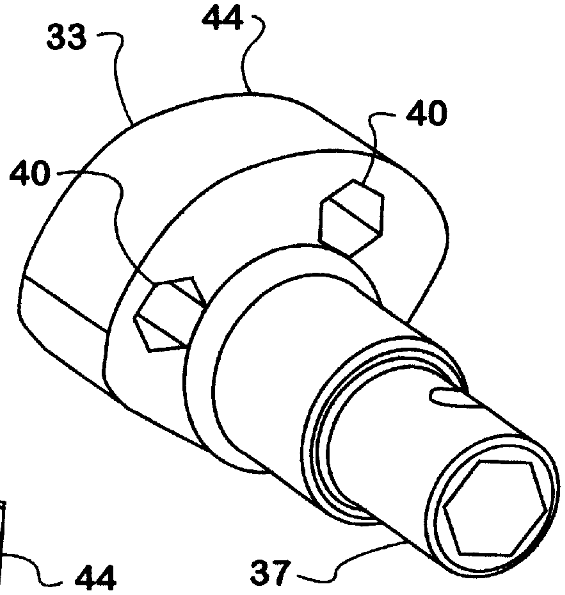
FIG. 13C
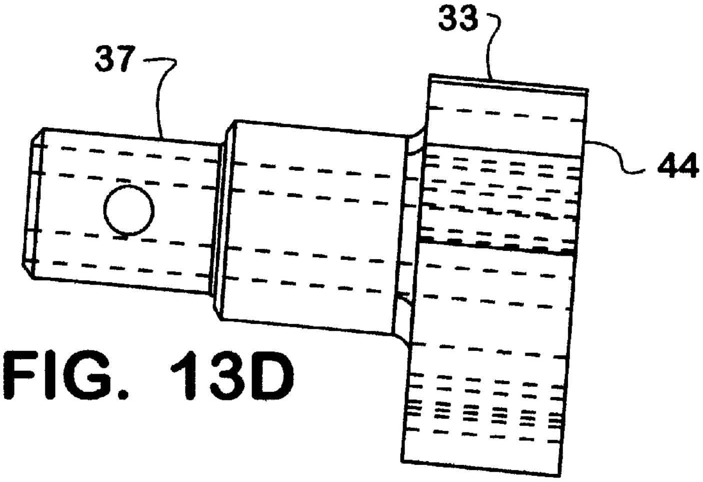
FIG. 13D

TELESCOPING TORSION BAR VEHICLE HOOD ASSIST SYSTEM

This is a non-provisional application claiming priority under provisional patent application Ser. No. 60/151,269 filed Aug. 27, 1999.

BACKGROUND OF THE INVENTION

The present invention is a torsion bar hood assist system for a vehicle. It is generally preferable to mount any torsion mechanism(s) of a hood assist system with the axis of the torsion mechanism(s) generally coincident with an axis about which the hood pivots. Mounting the torsion mechanism(s) of the hood assist system distant from the hood pivot axis can result in bending moments and other undesirable forces being imparted to the torsion mechanism (s) when the hood is pivoted about the hood pivot axis. The imposition of these undesirable stresses upon the torsion mechanism(s) can reduce the useful life of the torsion mechanism(s). Due to space concerns and other issues it is often difficult to mount the torsion mechanism(s) of a hood assist system at the hood pivot axis. Space constraints also limit the size of the torsion mechanism(s) of torsion bar hood assist systems. Because the size of the torsion mechanism(s) is limited, hood assist systems are often not capable of providing the desired amount of assistance to a person opening or closing the hood of the vehicle.

PRIOR ART

The closest known prior art patents are French patent Number 1,425,928, and U.S. Pat. No. 5,730,239.

SUMMARY OF INVENTION

In view of the above mentioned constraints it is an object of the present invention to provide a torsion bar hood assist system with the torsion mechanism(s) mounted distant from the hood pivot axis without significantly compromising durability of the system, Another object is to provide a torsion mechanism, which is capable of providing substantial amounts of assistance for a given size of the torsion mechanism.

The above mentioned objects of the invention as well as others not mentioned are satisfied as follows. The present invention is an effective, durable hood assist system with a compact torsion mechanism mounted distant from the hood pivot axis of the vehicle. The present invention also includes vehicles with the hood assist system installed. The torsion mechanism of the present invention includes at least two torsion bar sections. The torsion mechanism of the present invention is engaged to the frame of the vehicle and the hood of the vehicle. The engagement of the torsion mechanism to these components is such that a portion of the torsion mechanism, which is engaged to each respective component (the frame or the hood), is prevented from rotating relative to that component. The torsion mechanism is engaged to the hood and the frame such that translation of the torsion mechanism in a direction perpendicular to the hood pivot axis is allowed relative to one of the hood and the frame and prevented relative to the other of the hood and the frame. This makes it possible to mount the torsion mechanism distant from the hood pivot axis without causing undesirable stresses in the torsion mechanism when the hood is pivoted about the hood pivot axis. It can thus be seen that all of the above-mentioned objects of the invention, as well as others not mentioned, have been met.

DRAWINGS

Other objects and advantages of the invention will become more apparent upon perusal of the detailed description thereof and upon inspection of the drawings in which:

FIG. 6 shows different views of a torsion mechanism locating bracket and a torsion bar engagement member integrally engaged to one another.

FIG. 7 shows one potential embodiment of a torsion mechanism locating bracket.

FIG. 8 shows a torsion mechanism with a moment arm and a torsion mechanism locating bracket engaged to the torsion mechanism.

FIG. 10 shows a second embodiment of a torsion mechanism locating bracket.

FIG. 11 shows a hood support member and a torsion mechanism locating bracket engaged to the hood support member.

FIG. 13 shows one embodiment of a torsion bar engagement member for the hood assist system of the present invention.

DETAILS OF INVENTION

Figure 1:
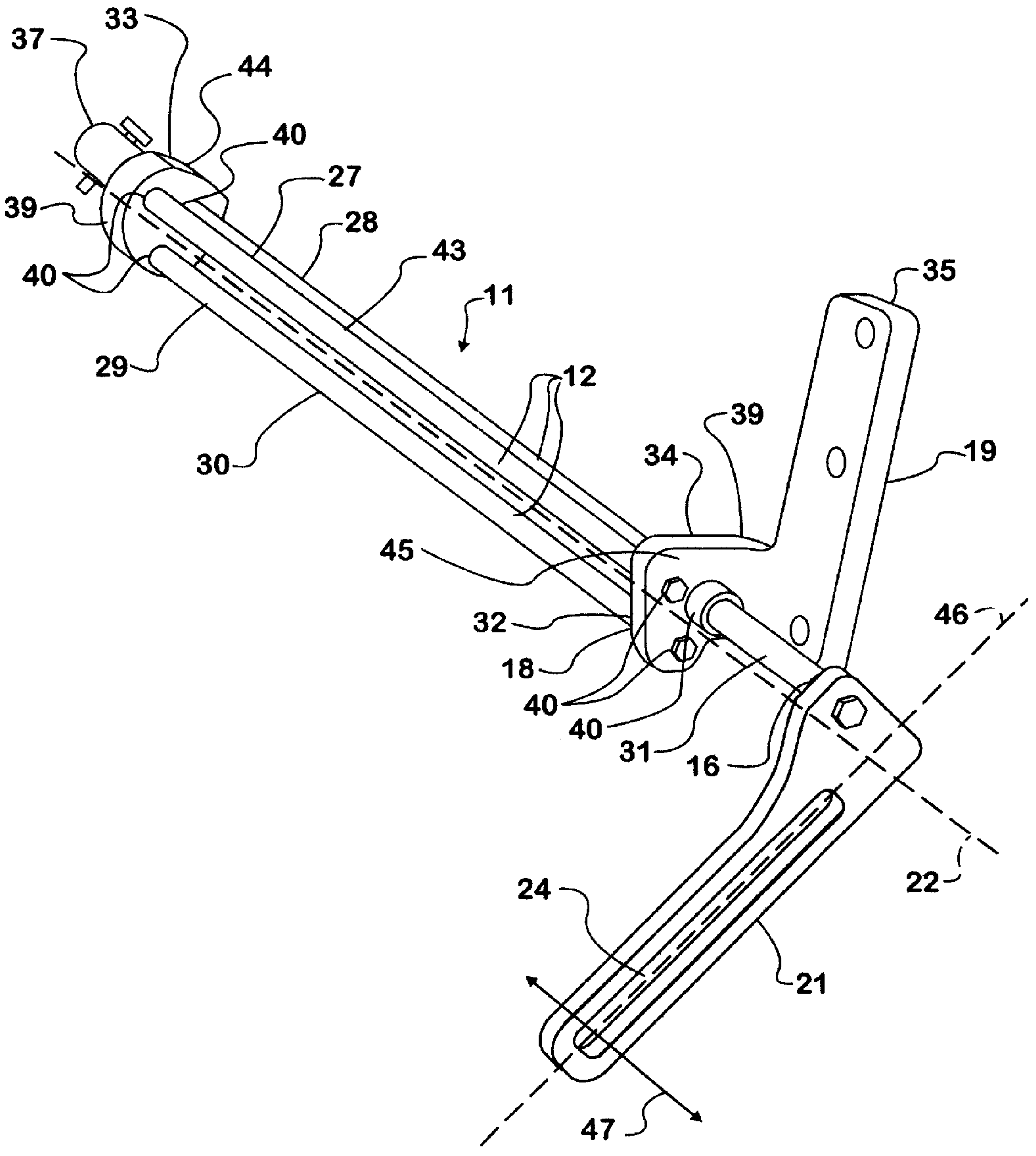
FIG. 1 is a perspective view of the torsion mechanism, the moment arm, and a torsion mechanism locating bracket of the hood assist system of the present invention.

The hood assist system 10 of the present invention includes a torsion mechanism 11. The torsion mechanism 11 is comprised of at least two torsion bar sections 12. The torsion mechanism 11 is mounted to the vehicle 15 with the axis 22 of the torsion mechanism 11 generally parallel to and distant from the hood pivot axis 17. The torsion mechanism 11 is engaged directly or indirectly to the frame 13 and the hood 14 of the vehicle 15. The torsion mechanism 11 is engaged to the frame 13 and the hood 14 such that translation of the torsion mechanism 11 in a direction perpendicular to the hood pivot axis 17 is allowed relative to one of the hood 14 and the frame 13 and prevented relative to the other of the hood 14 and the frame 13. The torsion mechanism 11 is primarily located on the vehicle 15 by torsion mechanism locating brackets 19. The torsion mechanism locating brackets 19 engage the torsion mechanism 11 in such a manner preventing the torsion mechanism 11 from translating relative to the torsion mechanism locating brackets 19 in directions perpendicular to the axis 22 of the torsion mechanism 11. The torsion mechanism locating brackets 19 are in turn fixedly engaged to either the frame 13 or the hood 14 of the vehicle and thus prevent translation of the torsion mechanism 11 relative to whichever of the frame 13 and hood 14 the torsion mechanism 11 is mounted to. In order to provide assistance to a person pivoting the hood 14 the torsion mechanism must be engaged to some degree to both the frame 13 and the hood 14. The torsion mechanism 11 is engaged to the frame 13 in a manner such that a frame engagement portion 16 of the torsion mechanism 11 is prevented from rotating relative to the frame 13 about any axis parallel to the axis 22 of the torsion mechanism 11. The torsion mechanism 11 is engaged to the hood 14 in a manner such that a hood engagement portion 18 of the torsion mechanism 11 is prevented from rotating relative to the hood 14 about any axis parallel to the axis 22 of the torsion mechanism 11. Each of the at least two torsion bar sections 12 of the torsion mechanism 11 are engaged between the frame engagement portion 16 and the hood engagement portion 18 of the torsion mechanism 11. Thus, when the hood 14 is rotated relative to the frame 13, each of the at least two torsion bar sections 12 is twisted toward or away from its free state. The at least two torsion bar sections 12 are closest to their free state when the hood 14 is in its fully open position. Thus, when the hood 14 is rotated toward the closed position the at least two torsion bar sections 12 store energy. When the hood is subsequently rotated toward the open position the energy stored in the at least two torsion bar sections is released and assists in the opening of the hood 14.

Figure 2:
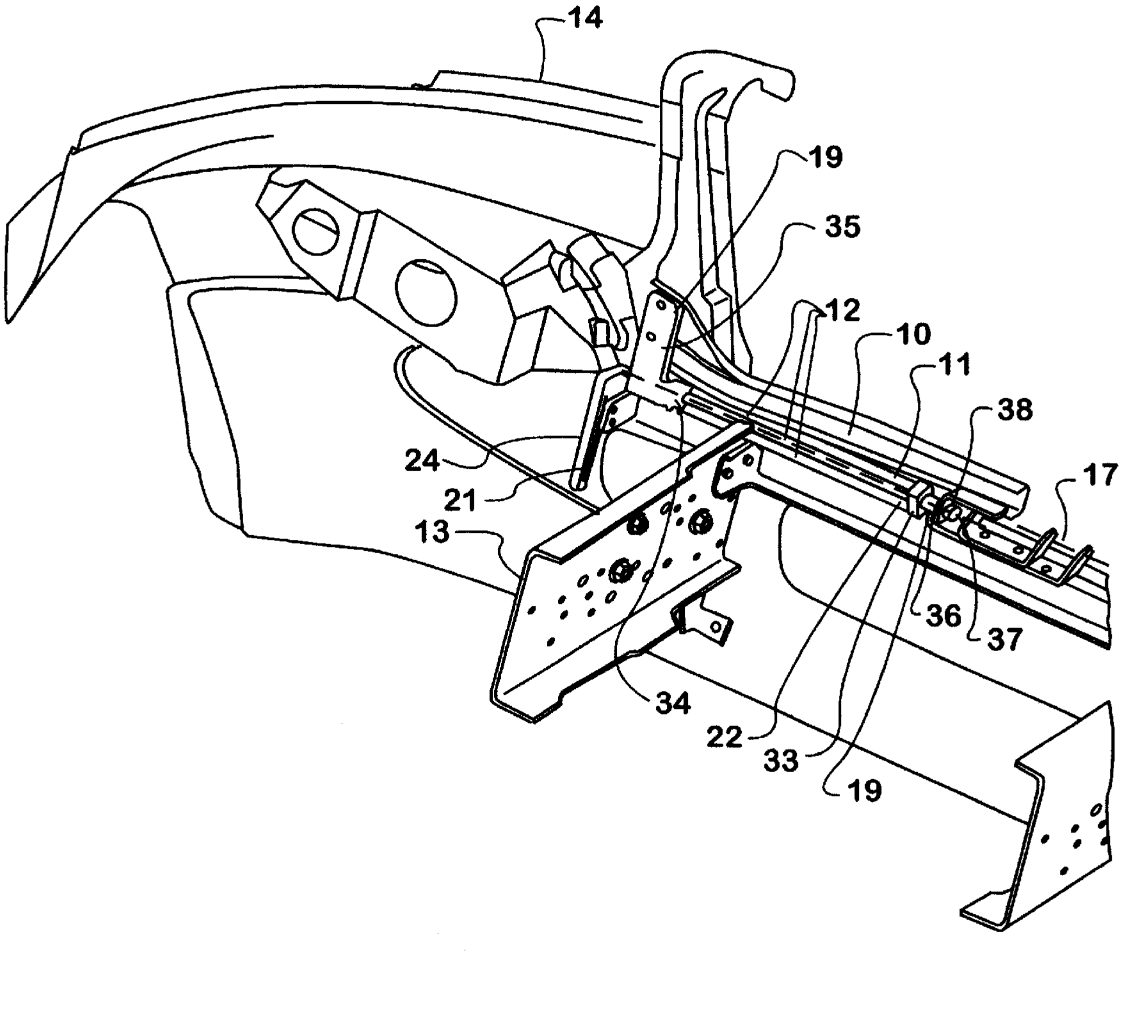
FIG. 2 is a perspective view of a hood assist system according to the present invention assembled to a frame and a hood of a vehicle.
Figure 3:
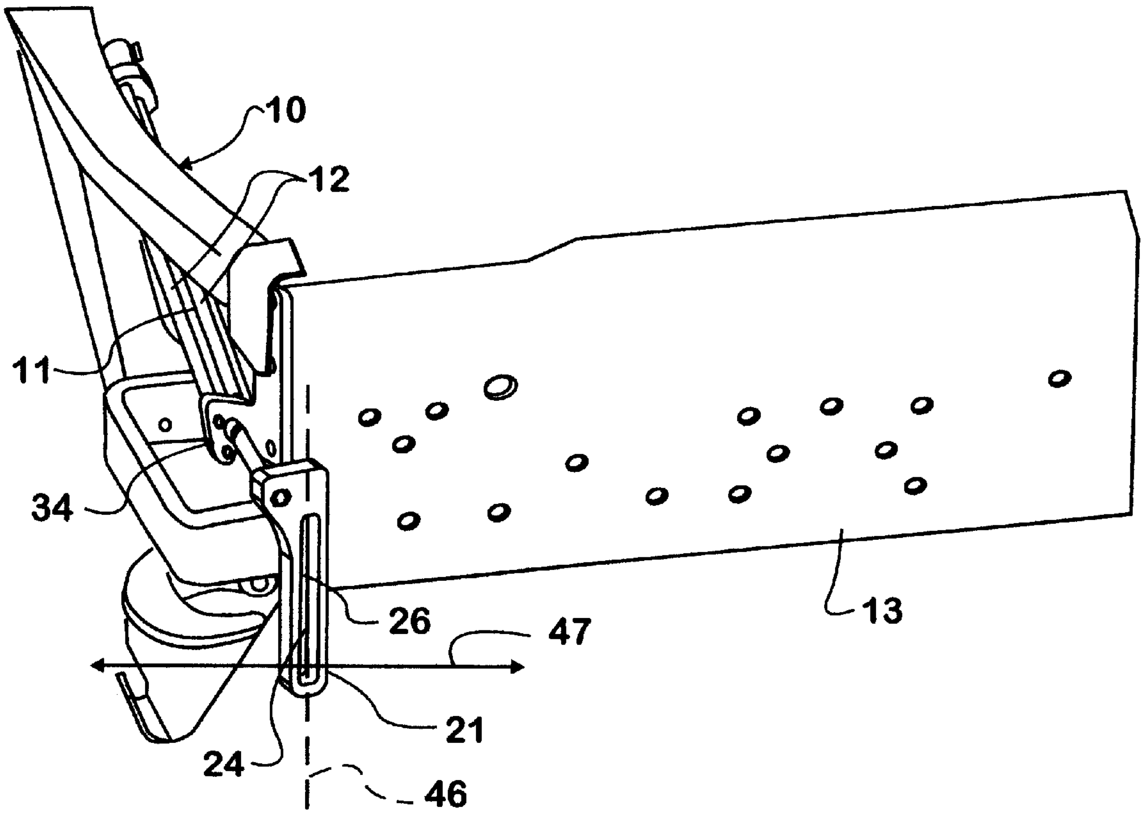
FIG. 3 is a perspective view of a hood assist system of the present invention assembled to a frame of a vehicle.
Figure 4A:
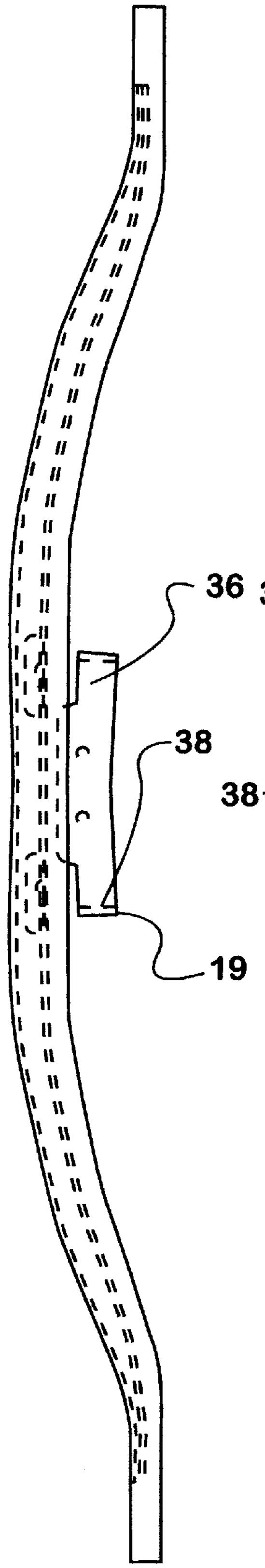
FIG. 4 shows a hood reinforcement member with a torsion mechanism locating bracket mounted to it.
Figure 4B:
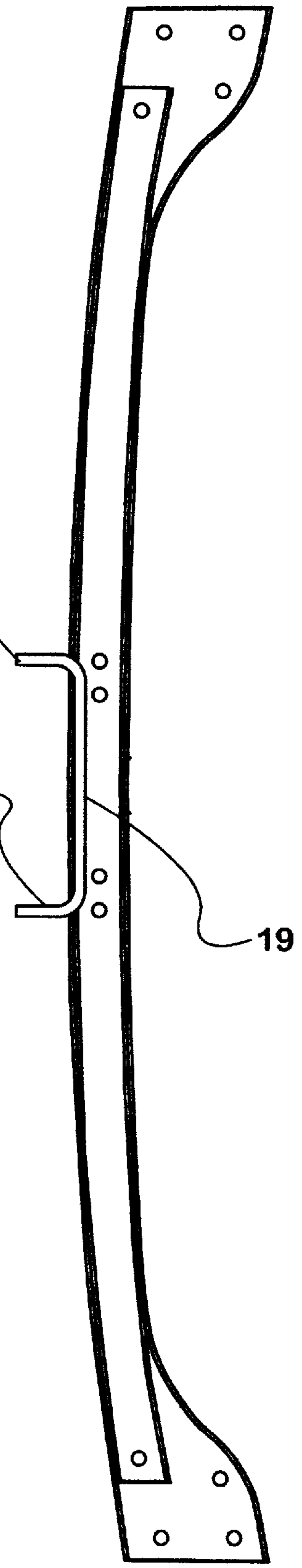
Figure 4C:
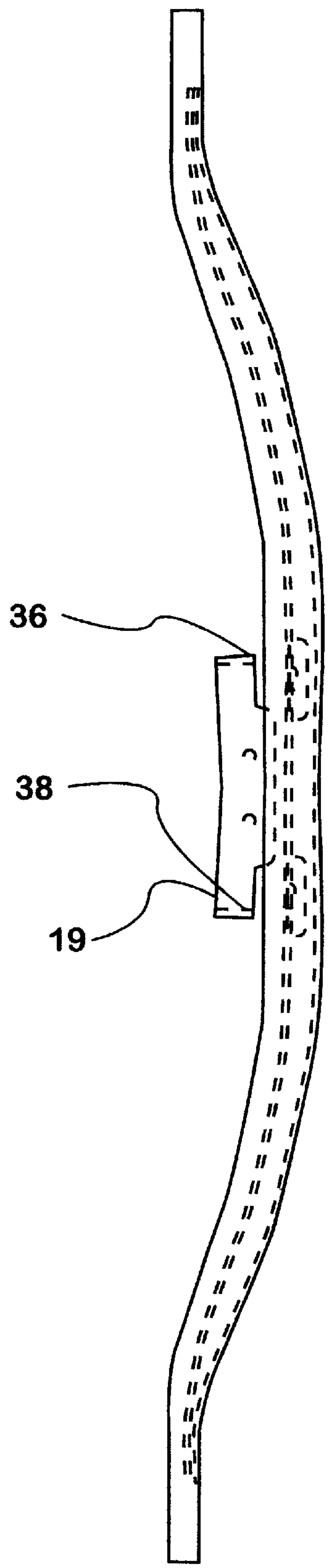
Figure 5A:
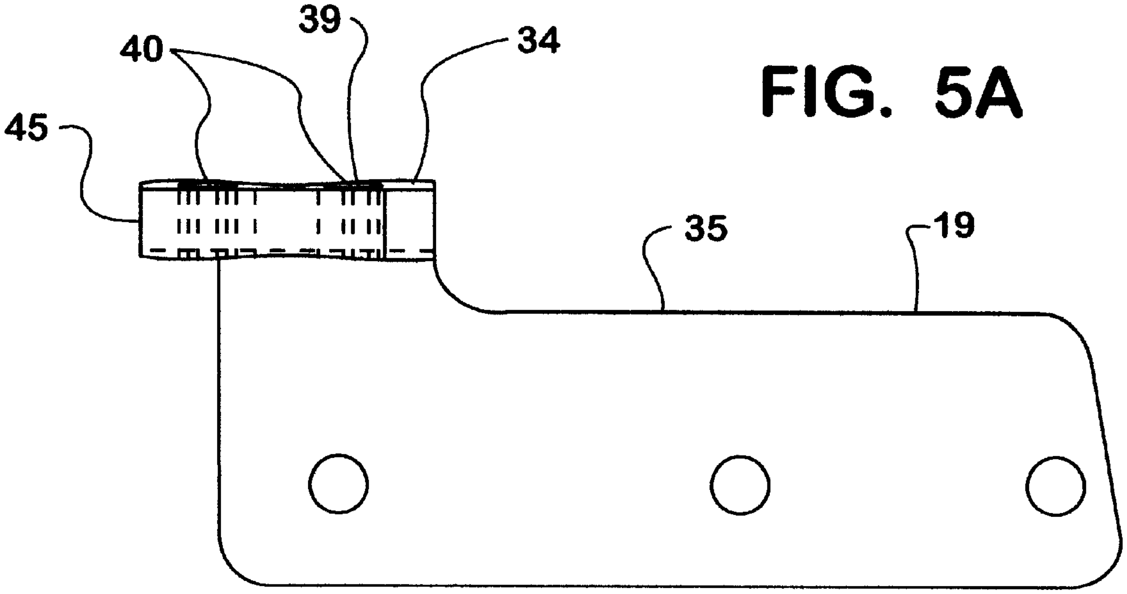
FIG. 5 shows a torsion mechanism locating bracket and a torsion bar engagement member which are integrally engaged to one another.
Figure 5B:
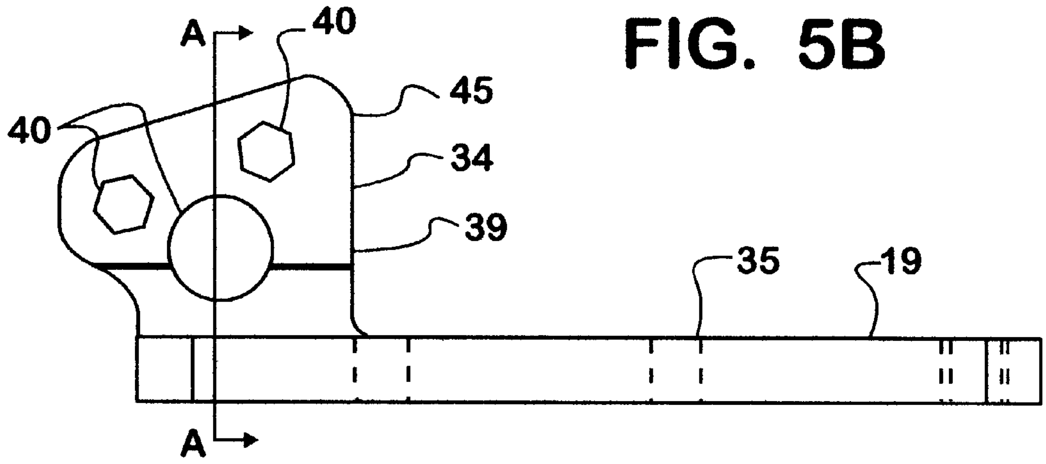
Figure 9A:
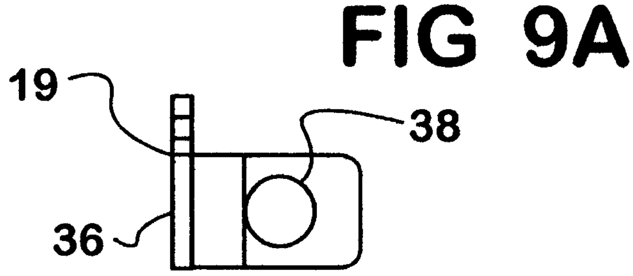
FIG. 9 shows one embodiment of a torsion mechanism locating bracket.
Figure 9B:
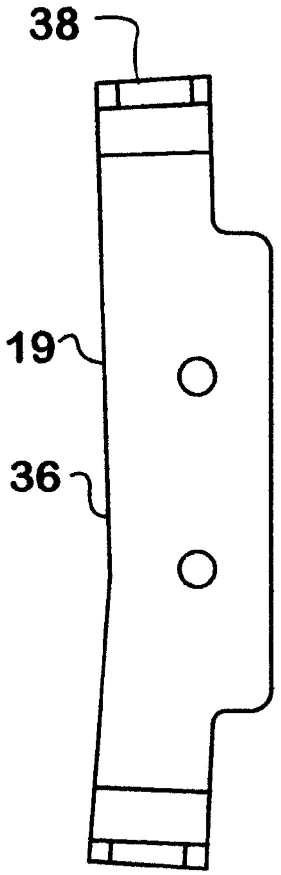
Figure 12A:
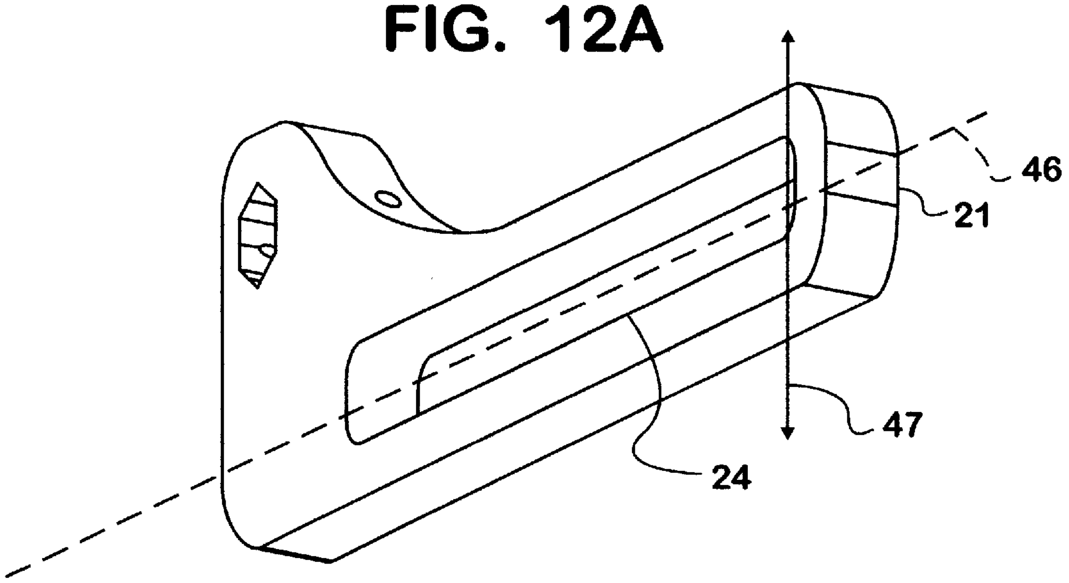
FIG. 12 shows one embodiment of a moment arm for the hood assist system of the present invention.
Figure 12B:
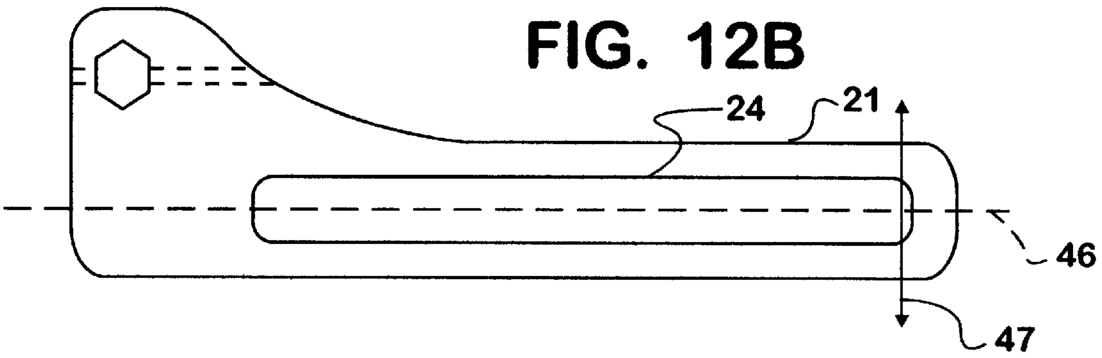
Figure 12C:
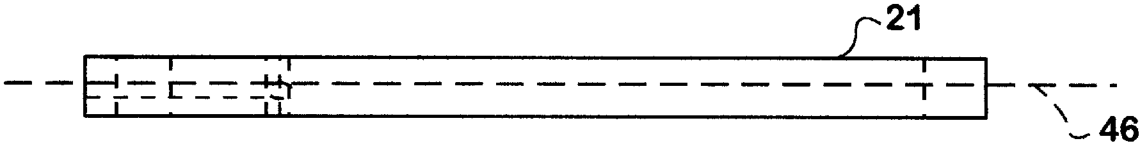
Figure 14:
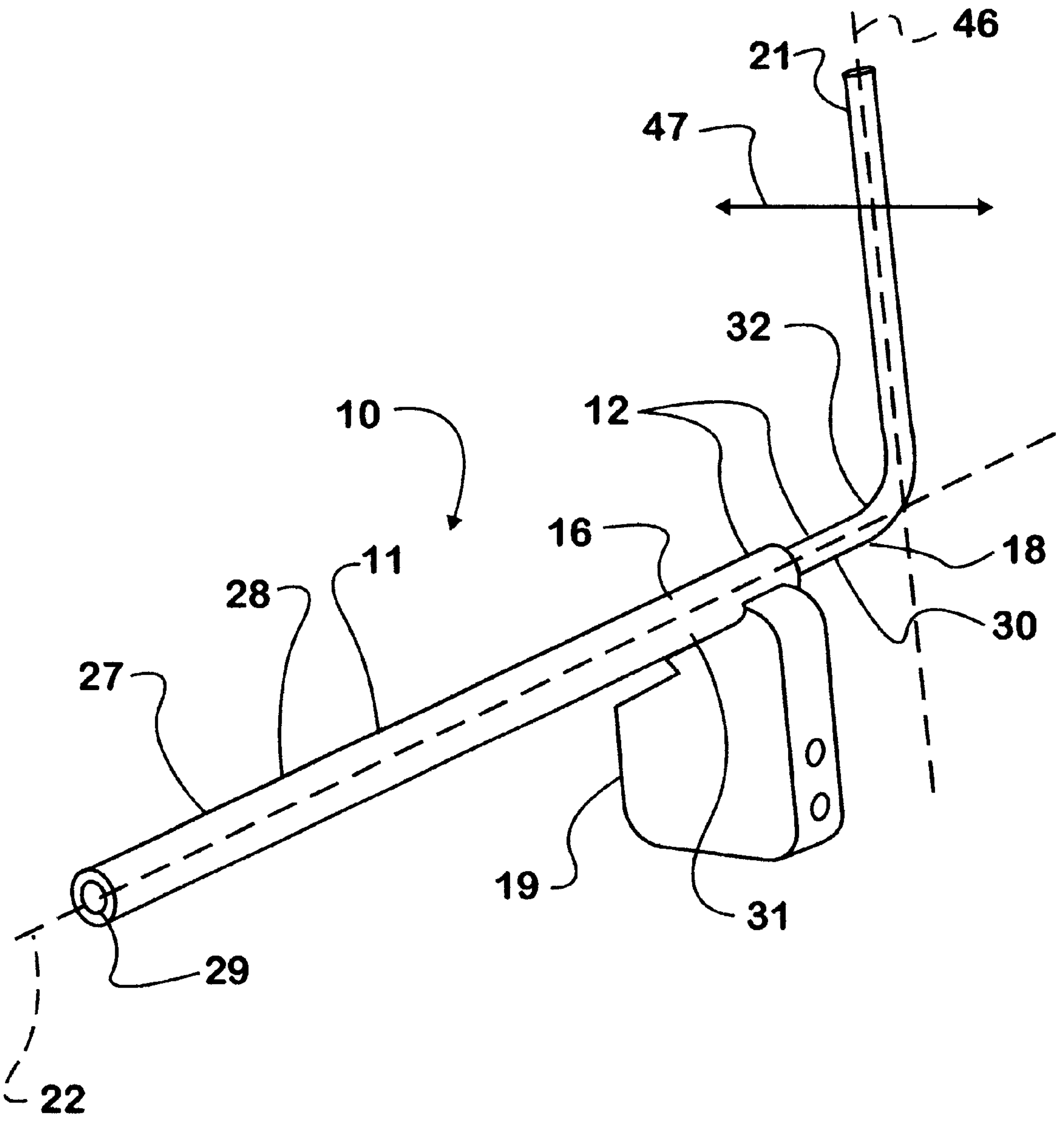
FIG. 14 is a perspective view of an embodiment of the invention with a torsion bar section inside of another torsion bar section.
Figure 15:
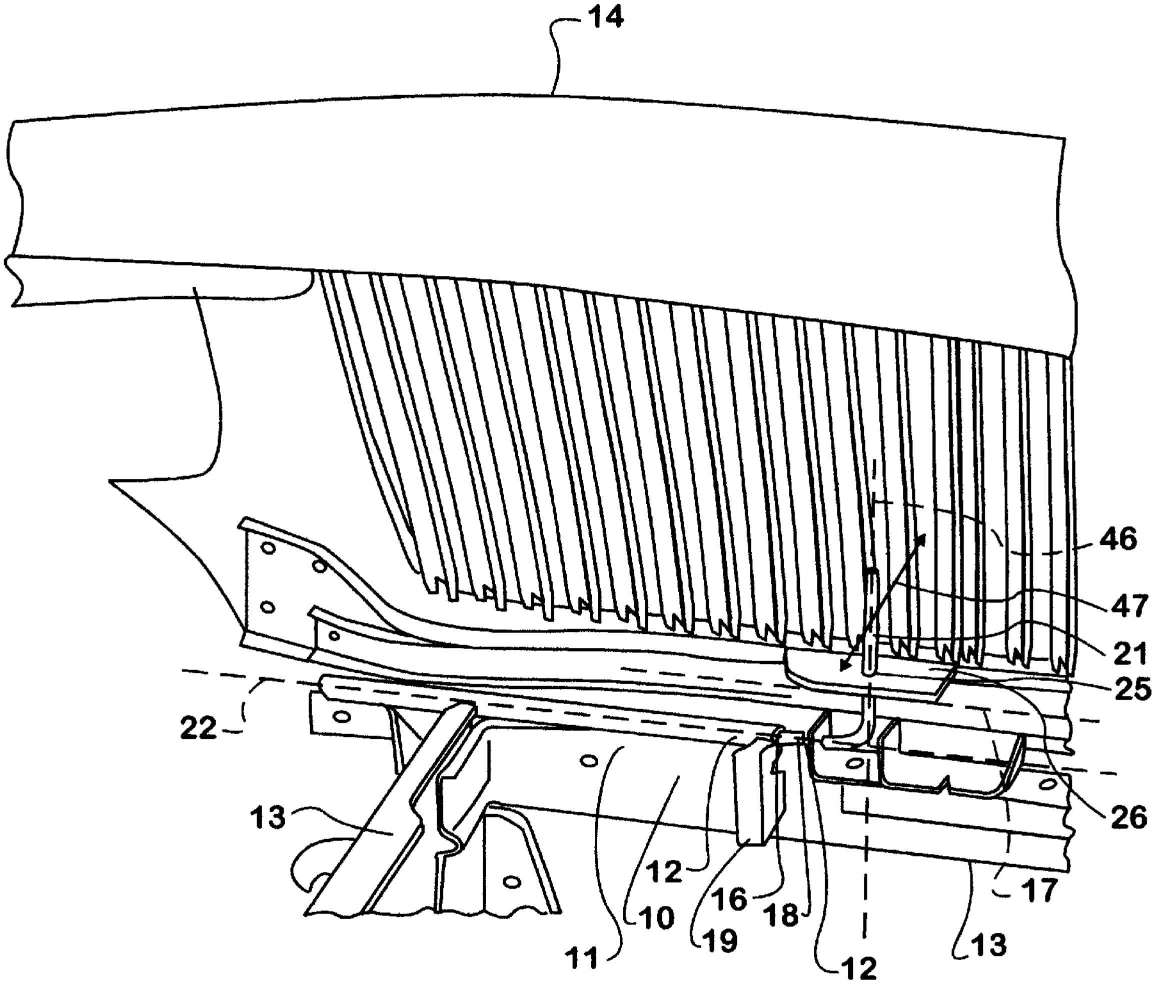
FIG. 15 is a perspective view of an embodiment of the invention with a torsion bar section inside of another torsion bar section and mounted to a vehicle.
Figure 16:
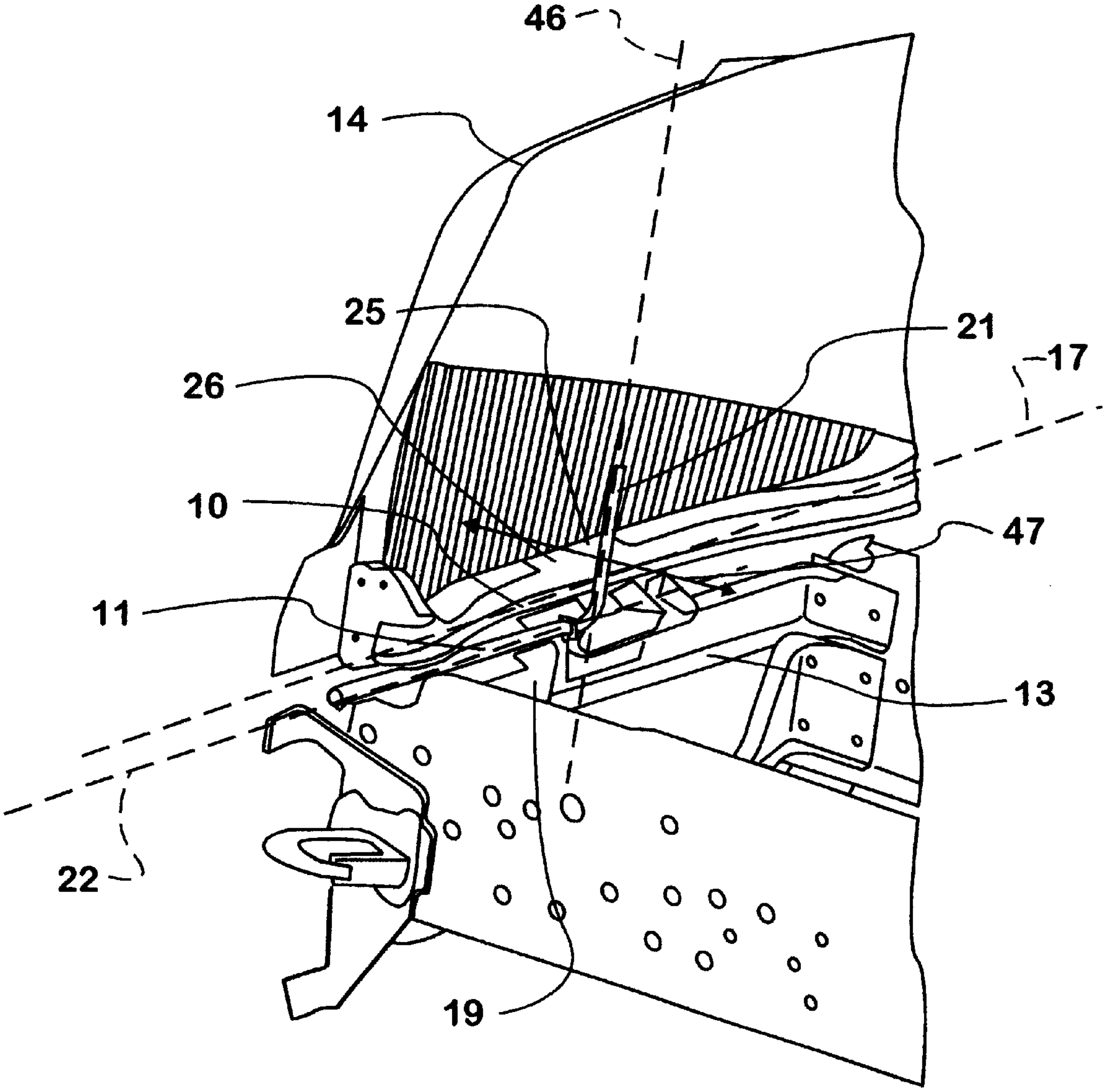
FIG. 16 is a perspective view of an embodiment of the invention with a torsion bar section inside of another torsion bar section and mounted to a vehicle.
Figure 17A:
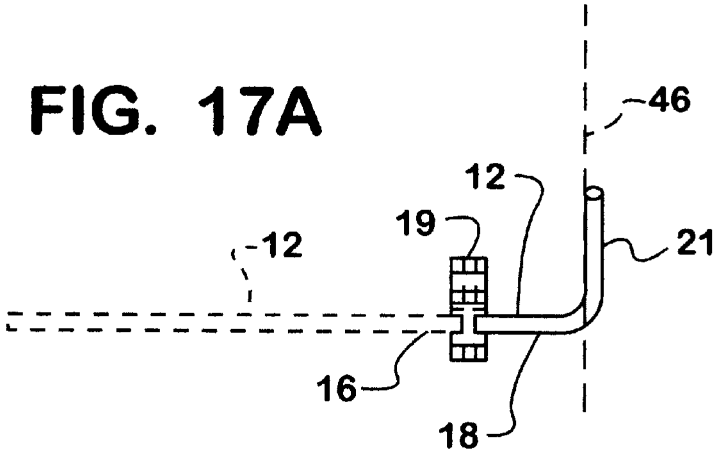
FIG. 17 shows a potential embodiment of the hood assist system with one torsion bar section inside of another torsion bar section.
Figure 17B:
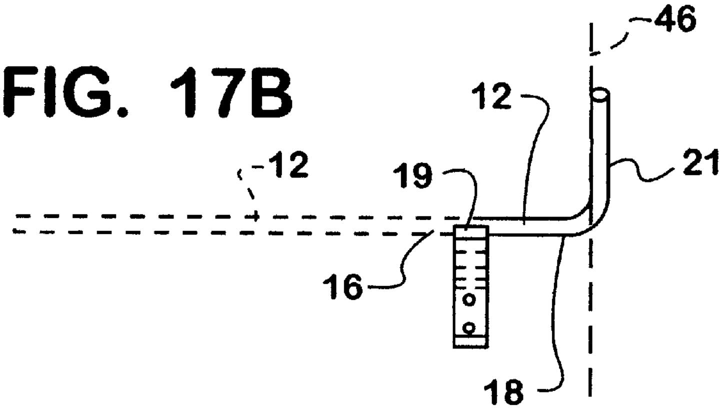
Figure 17C:
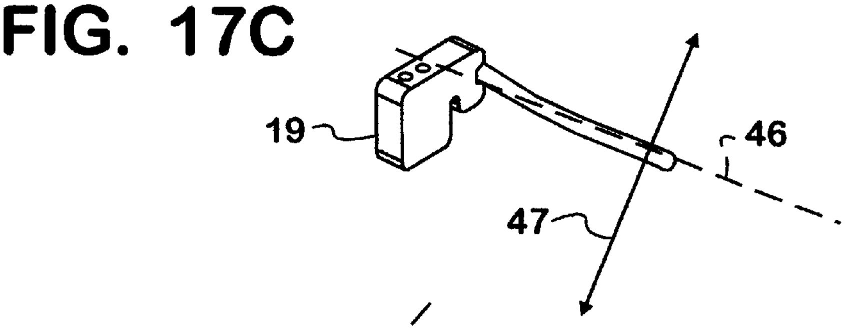
Figure 17D:
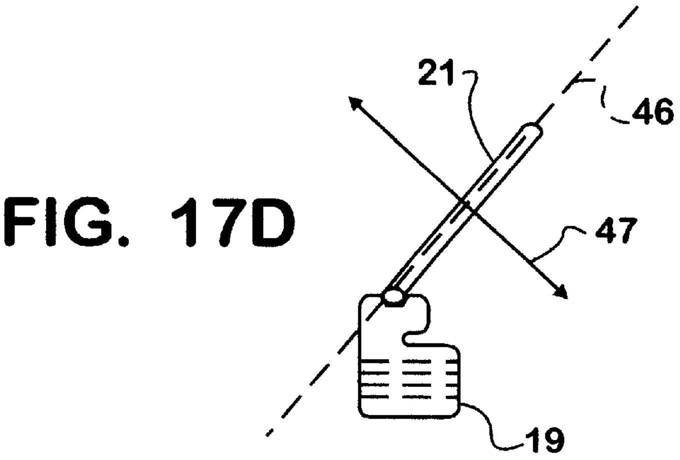
Figure 18:
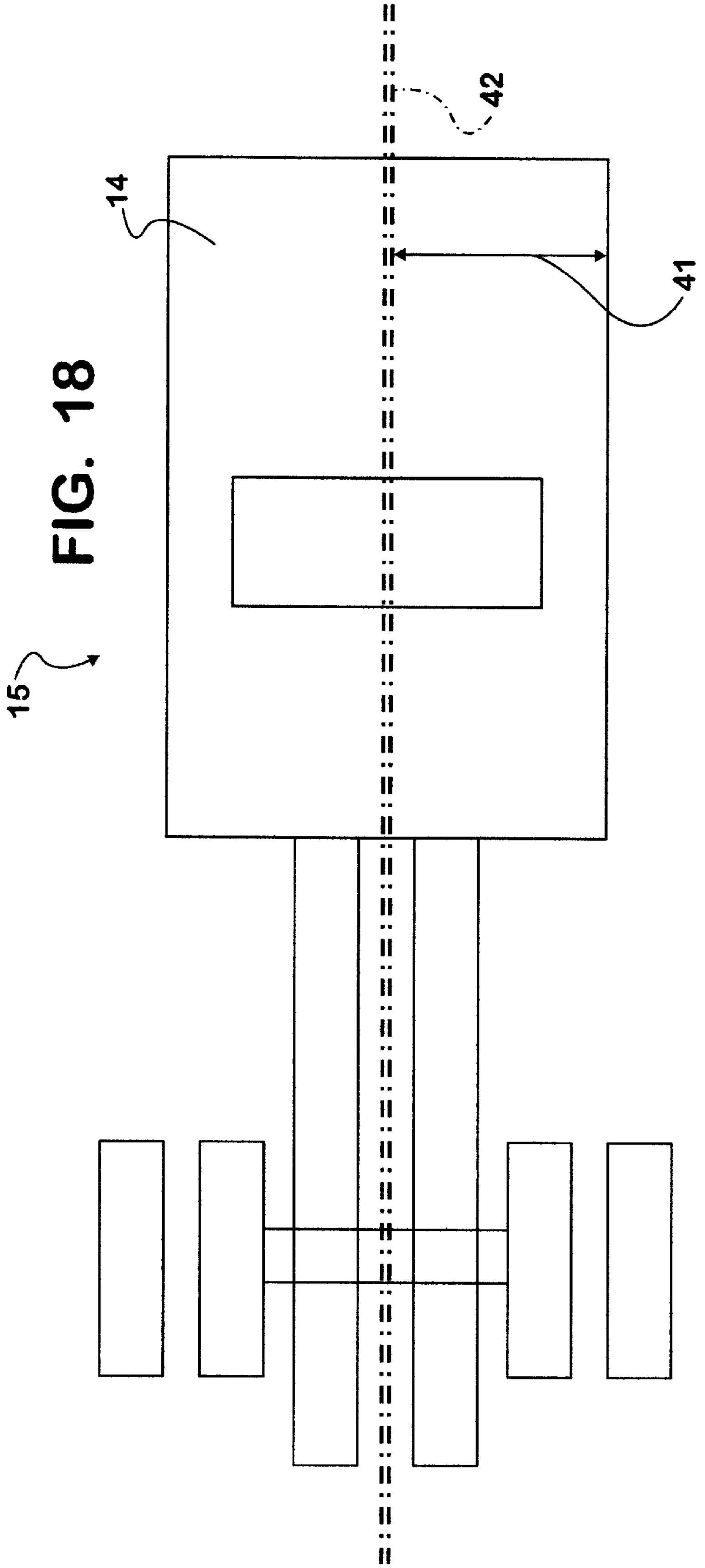
FIG. 18 is a plan view of a vehicle to which a hood assist system in accordance with the present invention could be mounted.

Unique accommodations must be made for engaging either the frame engagement portion 16 or the hood engagement portion 18 to the vehicle 15 dependent upon which of one of the frame 13 and the hood 14 the torsion mechanism 11 is mounted to. For instance, in the case where the torsion mechanism mounting locating brackets 19 are engaged to the hood 14, unique structure must be present for engaging the frame engagement portion 16 of the torsion mechanism 11 to the frame 13 (as is shown in FIGS. 1, 2, and 3). This is so that the torsion mechanism 11 is allowed to translate relative to the frame 13 in directions perpendicular to the axis 22 of the torsion mechanism 11. This unique structure for engaging the frame engagement portion 16 of the torsion mechanism 11 to the frame 13 must also fix the frame engagement portion 16 rotationally relative to the frame 13 about the axis 22 of the torsion mechanism 11. A similar means of engagement between the hood engagement portion 18 of the torsion mechanism 11 and the hood 14 must be employed in instances where the torsion mechanism locating brackets 19 are engaged to the frame 13 (as shown in FIGS. 14–17). A moment arm 21 is engaged to the torsion mechanism 11 and a moment arm engagement member 26 which is in turn fixedly engaged to whichever of the frame 13 and the hood 14 the torsion mechanism 11 needs to be movable with respect to. The moment arm 21 is a member, which is disposed such that it extends from the torsion mechanism 11 at least partially in a direction perpendicular to the axis 22 of the torsion mechanism 11. The moment arm 21 is fixedly engaged to either the frame engagement portion 16 or the hood engagement portion 18 of the torsion mechanism 11. If the torsion mechanism 11 is mounted to the hood 14, the moment arm 21 must be fixedly engaged to the frame engagement portion 16 of the torsion mechanism 11 (as is shown in FIGS. 1, 2, and 3). If the torsion mechanism 11 is mounted to the frame 13, the moment arm 21 must be fixedly engaged to the hood engagement portion 18 of the torsion mechanism 11 (as is shown in FIGS. 14, 15, and 16). The moment arm 21 is engaged to the moment arm engagement member 26 in such a manner that relative translation between the two components is allowed in the direction along an axis 46 of the moment arm 21. This slideable engagement of the moment arm 21 to the moment arm engagement member 26 allows for substantially free translation of the torsion mechanism 11 relative to the frame 13 or the hood 14 whichever the moment arm engagement member 26 is fixedly engaged to. The engagement of the moment arm 21 and the moment arm engagement member 26 prevents relative translation in direction 47, which is perpendicular to both the axis 46 of the moment arm and the axis 22 of the torsion mechanism 11. Because the moment arm 21 is engaged to the moment arm engagement member 26 in such a manner, and is also fixedly engaged to the torsion mechanism 11, it is prevented from rotating substantially about any axis parallel to the axis 22 of the torsion mechanism 11.

The moment arm 21, the moment arm engagement member 26, and the engagement of the moment arm 21 to the torsion mechanism 11 may be of many different forms. As is shown in FIGS. 1, 2, 3, 8, and 12 the moment arm 21 may be a removable member, which is fixedly engaged to the torsion mechanism 11. Alternatively, the moment arm 21 may be integrally attached to one of the at least two torsion bar sections 12 of the torsion mechanism 11 as is shown in FIGS. 14–17. The moment arm 21 may define a slot 24 or a bore with the axis of the slot 24 or the bore oriented in a direction at least partially perpendicular to the axis 22 of the torsion mechanism 11. A moment arm 21 which defines a slot 24 (which is shown in FIGS. 1, 2, 3, 8 and 12) is designed to slideably engage the moment arm engagement member 26, which is in turn fixedly engaged to the frame 13 or the hood 14. In the case where the moment arm 21 defines a slot 24 or a bore the moment arm engagement member 26 is preferably a pin. The moment arm 21 may alternatively protrude slideably through an opening 25 in a moment arm engagement member 26 mounted to either the frame 13 or the hood 14 as is shown in FIGS. 14–17.

The arrangement of each of the at least two torsion bar sections 12 within the torsion mechanism 11 is important in order to keep the torsion mechanism 11 compact. It is preferred that each of the at least two torsion bar sections 12 be disposed physically parallel to the rest of the at least two torsion bar sections 12. Each of the at least two torsion bar sections 12 within the torsion mechanism 11 may be engaged to one or more torsion bar engagement members 39. The one or more torsion bar engagement members 39 which may be present in the torsion mechanism 11 function to locate one or more of the at least two torsion bar sections 12 relative to other components of the torsion mechanism 11. The one or more torsion bar engagement members 39 preferably engage some or all of the at least two torsion bar sections 12 in a manner preventing translation of the torsion bar sections relative to other components of the torsion mechanism 11. The at least two torsion bar sections 12 may be engaged to the one or more torsion bar engagement members 39 at one or more engagement points 40. The manner of engagement between the torsion bar sections and the torsion bar engagement members at each of the individual ones of these engagement points 40 may be different. A torsion mechanism 11 may have torsion bar sections which are fixedly engaged to torsion bar engagement members at some of the engagement points 40 and rotatably engaged to the torsion bar engagement members at others of the engagement points 40. Some or all of the one or more torsion bar engagement members 39 may also be engaged to the torsion mechanism locating brackets 19 and would thus be one of the series of components which mount the torsion mechanism 11 to the vehicle 15. Any engagement between the one or more torsion bar engagement members 39 and the torsion mechanism locating brackets 19 would be of a manner preventing translation of the two components relative to one another in a direction perpendicular to the axis 22 of the torsion mechanism 11. Dependent upon its intended function within the hood assist system, each of the one or more torsion bar engagement members 39 may be fixed or allowed to rotate relative to any of the one or more torsion mechanism locating brackets 19 to which it is engaged. It is also preferred that two or more of the at least two torsion bar sections 12 be of similar length to one another. For example, the shorter torsion bar section would be of a length at least half of the length of the longer torsion bar section. It is not necessary, but also preferred, that all torsion bar sections be of such a similar length. It is also preferred that each of the torsion bar sections, which are of a similar length, occupy a similar position along the axis 22 of the torsion mechanism 11. With the similar length torsion bar sections occupying similar axial positions, the shortest of the similar length torsion bar sections extends very little if any beyond the ends of the longest of the similar length torsion bar sections. A torsion mechanism 11 of this design is compact and is capable of providing a very desirable level of assistance to a person opening the hood 14 of the vehicle 15. In the preferred embodiment the torsion mechanism 11 is of a length such that it is less than half of a width 41 of the vehicle 15. In this preferred embodiment the hood assist system 10 is designed such that it is can be mounted and contained on one lateral half of the vehicle 15. In other words, all of the components of the hood assist system 10 would be mounted and contained to one side of a longitudinal centerline 42 of the vehicle 15.

The present invention contemplates further innovations in the arrangement of the at least two torsion bar sections 12 for making the torsion mechanism 11 compact. As is shown in FIGS. 14–17 one of the at least two torsion bar sections 12 may be tubular and another of the at least two torsion bar sections 12 may be disposed within the tubular torsion bar section.

The manner in which each of the at least two torsion bar sections 12 are engaged to other components of the torsion mechanism 11 effects the mechanical behavior of the torsion mechanism 11. The at least two torsion bar sections 12, which are physically parallel to one another, may act as springs, which are in series, or in parallel or a combination of the two. In the preferred embodiment, two of the at least two torsion bar sections 12 act as springs in series. An example of one possible configuration of this preferred embodiment is shown in FIGS. 1, 2, 3, and 8. In this preferred embodiment, a first end 27 of a first torsion bar section 28 is engaged to a first end 29 of a second torsion bar section 30. The torsion mechanism 11 may further include a first torsion bar engagement member 33 engaged between the first end 27 of the first torsion bar section 28 and the first end 29 of the second torsion bar section 30. A second end 31 of the first torsion bar section 28 is in turn engaged to the frame engagement portion 16 of the torsion mechanism 11. A second end 32 of the second torsion bar section 30 is engaged to the hood engagement portion 18 of the torsion mechanism 11. Thus, the first torsion bar section 28 and the second torsion bar section 30 act as springs in series or like a single torsion bar of considerably greater length that of either the first torsion bar section 28 or the second torsion bar section 30. As mentioned above, the moment arm 21 of the hood assist system 10 is engaged to either the hood engagement portion 18 or the frame engagement portion 16 of the torsion mechanism 11. As best shown in FIGS. 1, 2, and 3, in the instance where the moment arm 21 is intended to be engaged to the frame engagement portion 16 of the torsion mechanism 11 a second torsion bar engagement member 34 may be fixedly engaged to the hood engagement portion 18 of the torsion mechanism 11. In this instance, the second torsion bar engagement member 34 is fixedly engaged to the second end 32 of the second torsion bar section 30 and a first torsion mechanism locating bracket 35. In the instance where the moment arm 21 is engaged to the hood engagement portion 18 of the torsion mechanism 11 a second torsion bar engagement member 34 may be fixedly engaged to the frame engagement portion 16 of the torsion mechanism 11. In this instance, the second torsion bar engagement member 34 is engaged between the second end 31 of the first torsion bar section 28 and a first torsion mechanism locating bracket 35.

The present invention also contemplates engaging torsion bar sections to the other components of the torsion mechanism 11 such that they behave as springs in parallel. Two or more of the at least two torsion bar sections 12 may be engaged to the torsion mechanism 11 in a manner such that they act as torsional springs in parallel. One end of each of at least two of said at least two torsion bar sections 12 is fixedly engaged to a first common rigid structural element 44. Another end of each of said at least two of said at least two torsion bar sections is fixedly engaged to a second common rigid structural element 45. Thus, said at least two of said at least two torsion bar sections 12 behave as torsional springs in parallel between said first common rigid structural element 44 and said second common rigid structural element 45. An example of a torsion mechanism 11 with torsion bar sections, which behave as springs in series and parallel, is shown in FIGS. 1, 2, 3, and 8. In the embodiment shown in the above-mentioned figures, the torsion mechanism 11 is comprised of a third torsion bar section 43. One end of the third torsion bar section 43 and one end of the second torsion bar section 30 are engaged to a first common rigid structural element 44. The other end of the third torsion bar section 43 and the other end of the second torsion bar section 30 are engaged to a second common rigid structural element 45. Thus, the second torsion bar section 30 and the third torsion bar section 43 act as springs in parallel between the first common rigid structural element 44 and the second common rigid structural element 45. In the embodiment shown in FIGS. 1, 2, 3, and 8 the first common rigid structural element 44 is indirectly fixedly engaged to the hood 14 and the second common rigid structural element 45 is engaged to the first torsion bar section 28. Thus, in the embodiment shown in the above mentioned figures, the combination of the second torsion bar section 30 and the third torsion bar section 43 act as springs in parallel and in turn act as a spring in series with the first torsion bar section 28. It should be understood that additional torsion bar sections may be engaged to the torsion mechanism 11 in a manner such that they act as springs in parallel with either the second torsion bar section 30 or the first torsion bar section 28. The invention also encompasses hood assist systems where the at least two torsion bar sections 12 may be engaged to the torsion mechanism 11 in a manner such that all of the torsion bar sections behave as springs in parallel.

Means for engaging the torsion mechanism 11 to a second torsion mechanism locating bracket 36, may be attached to the first torsion bar engagement member 33. FIGS. 1, 2, 3, 4, 8, 9, 10, and 11 show a hood assist system 10 and components thereof in accordance with this embodiment of the present invention. A torsion mechanism locating shaft 37 may be fixedly engaged to the first torsion bar engagement member 33. The torsion bar locating shaft 37 would protrude from the first torsion bar engagement member 33 with an axis of the torsion mechanism locating shaft 37 parallel to the axis 22 of the torsion mechanism 11. The second torsion mechanism locating bracket 36 would define an opening 38. When the hood assist system was properly assembled the torsion mechanism locating shaft 37 would be disposed within the opening 38 defined by the second torsion mechanism locating bracket 36. The engagement of the torsion mechanism locating shaft 37 within the opening 38 would be such that translation of the torsion mechanism locating shaft 37 relative to the second torsion mechanism locating bracket 36 in directions perpendicular to the axis of the torsion mechanism locating shaft 37 would be prevented. Rotation of the torsion mechanism locating shaft 37 relative to the second torsion mechanism locating bracket 36 about the axis of the torsion mechanism locating shaft 37 would be substantially freely allowed.

Those skilled in the art will appreciate that modifications could be made to the invention as described without departing from the spirit and scope of the invention and thus the scope of the invention is limited only by the following claims.

We claim:

1. A hood assist system for a vehicle which has a frame and a hood which is pivotally mounted to the frame about a hood pivot axis, comprising:

(a) a torsion mechanism;

(b) at least two torsion bar sections which comprise a portion of said torsion mechanism;

(c) at least one torsion mechanism locating bracket which is engaged to said torsion mechanism in a manner preventing translation of said torsion mechanism relative to said torsion mechanism locating bracket in a direction perpendicular to an axis of said torsion mechanism;

(d) wherein said at least one torsion mechanism locating bracket is designed to be fixedly engaged to either the hood or the frame of the vehicle and is designed to be moveable relative to whichever of the hood or the frame of the vehicle it is not designed to be fixedly engaged to such that said torsion mechanism is moveable relative to whichever of the hood and the frame said at least one torsion mechanism locating bracket is not designed to be fixedly engaged to;

(e) wherein said torsion mechanism is designed to be mounted through said at least one torsion mechanism locating bracket to one of the hood and the frame such that said axis of said torsion mechanism is disposed generally parallel to and at a distance from the hood pivot axis;

(f) wherein each of said at least two torsion bar sections of said torsion mechanism are engaged between a frame engagement portion and a hood engagement portion of said torsion mechanism;

(g) a moment arm which is fixedly engaged to one of said frame engagement portion and said hood engagement portion of said torsion mechanism;

(h) a moment arm engagement member which is designed to be fixedly engaged to the frame or the hood whichever said at least one torsion mechanism locating bracket is not designed to be fixedly engaged to and is designed to be movable relative to;

(i) wherein when said hood assist system is mounted to the vehicle said moment arm engages said moment arm engagement member in a manner such that said moment arm is free to translate relative to said moment arm engagement member in a direction which is substantially parallel to an axis of said moment arm and said moment arm is engaged to said moment arm engagement member and said torsion mechanism in a manner preventing said moment arm from rotating substantially about any axis parallel to said axis of said torsion mechanism; and (j) structure that is engaged to whichever of said hood engagement portion and said frame engagement portion said moment arm is not fixedly engaged to and, which is designed to be engaged to whichever of the frame and the hood said moment arm engagement member is not engaged to, in such a manner to prevent relative rotation between whichever of said frame engagement portion and said hood engagement portion said structure is engaged to and whichever of the frame and the hood said structure is engaged to.

2. The hood assist system of claim 1, wherein:

(a) two or more of said at least two torsion bar sections are of similar lengths and are disposed physically parallel to one another; and (b) two or more of said at least two torsion bar sections occupy similar axial positions along said axis of said torsion mechanism, such that shorter ones of said two or more torsion bar sections which occupy a similar axial position as a longest torsion bar section do not extend beyond either end of said longest torsion bar section.

3. The hood assist system of claim 2, wherein:

(a) a first end of a first torsion bar section is directly or indirectly engaged to a first end of a second torsion bar section; and (b) a second end of said first torsion bar section is directly or indirectly engaged to said frame engagement portion of said torsion mechanism and a second end of said second torsion bar section is directly or indirectly engaged to said hood engagement portion of said torsion mechanism.

4. The hood assist system of claim 3, further comprising:

(a) one or more torsion bar engagement members; and (b) wherein said one or more torsion bar engagement members are engaged to one or more of said at least two torsion bar sections in a manner preventing translation of said torsion bar sections relative to other components of said torsion mechanism in directions perpendicular to said axis of said torsion mechanism.

5. The hood assist system of claim 4, wherein:

(a) said one or more torsion bar engagement members is comprised of a first torsion bar engagement member and a second torsion bar engagement member;

(b) said first torsion bar engagement member is engaged to said first end of said first torsion bar section and said first end of said second torsion bar section;

(c) said second torsion bar engagement member is fixedly engaged to a first torsion mechanism locating bracket and either said second send of said first torsion bar section or said second end of said second torsion bar section.

6. The hood assist system of claim 5, wherein:

(a) a torsion mechanism locating shaft is fixedly engaged to and protrudes from said first torsion bar engagement member;

(b) an axis of said torsion mechanism locating shaft is substantially parallel to said axis of said torsion mechanism; and (c) a second torsion mechanism locating bracket defines an opening in which said torsion mechanism locating shaft is designed to be engaged such that translation of said torsion mechanism locating shaft relative to said second torsion mechanism locating bracket in a direction perpendicular to said axis of said torsion mechanism locating shaft is prevented while rotation of said torsion mechanism locating shaft relative to said second torsion mechanism locating bracket about said axis of said torsion mechanism locating shaft is allowed.

7. The hood assist system of claim 6, wherein:

(a) said torsion mechanism is of a length which is less than one half of a width of the vehicle; and (b) said hood assist system is designed such that said hood assist system can be mounted and contained on one lateral half of the vehicle.

8. The hood assist system of claim 7, wherein:

(a) said at least two torsion bar sections is comprised of at least three torsion bar sections;

(b) wherein one end of each of at least two of said at least three torsion bar sections is fixedly engaged to a first common rigid structural element; and (c) another end of each of said at least two of said at least three torsion bar sections is fixedly engaged to a second common rigid structural element such that said at least two of said at least three torsion bar sections behave as torsional springs in parallel between said first common rigid structural element and said second common rigid structural element.

9. The hood assist system of claim 2, wherein:

(a) one end of each of at least two of said at least two torsion bar sections is fixedly engaged to a first common rigid structural element; and (b) another end of each of said at least two of said at least two torsion bar sections is fixedly engaged to a second common rigid structural element such that said at least two of said at least two torsion bar sections behave as torsional springs in parallel between said first common rigid structural element and said second common rigid structural element.

10. The hood assist system of claim 2, wherein:

(a) one of said at least two torsion bar sections is tubular; and (b) another of said at least two torsion bar sections is disposed within said torsion bar section which is tubular.

11. A vehicle, comprising:

(a) a frame;

(b) an operator compartment engaged to said frame from which an operator controls said vehicle;

(c) a powertrain engaged to said frame for propelling said vehicle;

(d) a suspension system engaged to said frame for supporting said frame of said vehicle;

(e) a hood, for covering an engine compartment of said vehicle, which is engaged directly to said frame of said vehicle or to some other component of said vehicle which is in turn engaged to said vehicle;

(f) wherein said hood is engaged to said vehicle in a manner such that said hood can be pivoted about a hood pivot axis between a closed position in which said hood covers said engine compartment and an open position in which said hood leaves said engine compartment exposed;

(g) a hood assist system for making it easier to pivot said hood about said hood pivot axis;

(h) a torsion mechanism;

(i) at least two torsion bar sections which comprise a portion of said torsion mechanism;

(j) at least one torsion mechanism locating bracket which is engaged to said torsion mechanism in a manner preventing translation of said torsion mechanism relative to said torsion mechanism locating bracket in a direction perpendicular to an axis of said torsion mechanism;

(k) wherein said at least one torsion mechanism locating bracket is fixedly engaged to either said hood or said frame of said vehicle and is moveable relative to whichever of said hood and said frame of said vehicle it is not fixedly engaged to such that said torsion mechanism is prevented from translating relative to whichever of said hood and said frame said at least one torsion mechanism locating bracket is fixedly engaged to and said torsion mechanism is moveable relative to whichever of said hood and said frame said at least one torsion mechanism locating bracket is not fixedly engaged to;

(l) wherein said torsion mechanism is mounted to one of said hood and said frame such that said axis of said torsion mechanism is disposed generally parallel to and at a distance from said hood pivot axis;

(m) wherein each of said at least two torsion bar sections of said torsion mechanism are engaged between a frame engagement portion and a hood engagement portion of said torsion mechanism;

(n) wherein when said hood of said vehicle is moved from an open position toward a closed position said at least two torsion bar sections are twisted and store energy such that when said hood is subsequently moved from a closed position toward an open position energy stored in said at least two torsion bar sections is released and assists in opening of said hood;

(o) wherein said torsion mechanism is engaged to said vehicle such that translation of said torsion mechanism in a direction perpendicular to said hood pivot axis is prevented relative to the one of said hood and said frame to which said at least one torsion mechanism locating bracket is engaged and allowed relative to the other one of said hood and said frame by said engagement of said torsion mechanism to said vehicle;

(p) a moment arm which is fixedly engaged to one of said frame engagement portion and said hood engagement portion of said torsion mechanism;

(q) a moment arm engagement member which is fixedly engaged to said frame or said hood whichever said at least one torsion mechanism locating bracket is not fixedly engaged to and said torsion mechanism is movable relative to;

(r) wherein said moment arm engages said moment arm engagement member in a manner such that said moment arm is free to translate relative to said moment arm engagement member in a direction which is substantially parallel to an axis of said moment arm and said moment arm is engaged to said moment arm engagement member and said torsion mechanism in a manner preventing said moment arm from rotating substantially about any axis parallel to said axis of said torsion mechanism; and (s) structure that is engaged to whichever of said hood engagement portion and said frame engagement portion said moment arm is not fixedly engaged to and, which is engaged to whichever of said frame and said hood said moment arm engagement member is not engaged to, in such a manner to prevent relative rotation between whichever of said frame engagement portion and said hood engagement portion said structure is engaged to and whichever of said frame and said hood said structure is engaged to.

12. The vehicle of claim 11, wherein:

(a) two or more of said at least two torsion bar sections are of similar lengths and are disposed physically parallel to one another; and (b) two or more of said at least two torsion bar sections occupy similar axial positions along said axis of said torsion mechanism, such that shorter ones of said two or more torsion bar sections which occupy a similar axial position as a longest torsion bar section do not extend beyond either end of said longest torsion bar section.

13. The vehicle of claim 12, wherein:

(a) a first end of a first torsion bar section is directly or indirectly engaged to a first end of a second torsion bar section; and (b) a second end of said first torsion bar section is directly or indirectly engaged to said frame engagement portion of said torsion mechanism and a second end of said second torsion bar section is directly or indirectly engaged to said hood engagement portion of said torsion mechanism.

14. The vehicle of claim 13, further comprising:

(a) one or more torsion bar engagement members; and (b) wherein said one or more torsion bar engagement members are engaged to one or more of said at least two torsion bar sections in a manner preventing translation of said torsion bar sections relative to other components of said torsion mechanism in directions perpendicular to said axis of said torsion mechanism.

15. The vehicle of claim 14, wherein:

(a) said one or more torsion bar engagement members is comprised of a first torsion bar engagement member and a second torsion bar engagement member;

(b) said first torsion bar engagement member is engaged to said first end of said first torsion bar section and said first end of said second torsion bar section; and (c) said second torsion bar engagement member is fixedly engaged to a first torsion mechanism locating bracket and either said second end of said first torsion bar section or said second end of said second torsion bar section.

16. The vehicle of claim 15, wherein:

(a) a torsion mechanism locating shaft is fixedly engaged to and protrudes from said first torsion bar engagement member;

(b) an axis of said torsion mechanism locating shaft is substantially parallel to said axis of said torsion mechanism; and (c) a second torsion mechanism locating bracket defines an opening in which said torsion mechanism locating shaft is engaged such that translation of said torsion mechanism locating shaft relative to said second torsion mechanism locating bracket in a direction perpendicular to said axis of said torsion mechanism locating shaft is prevented while rotation of said torsion mechanism locating shaft relative to said second torsion mechanism locating bracket about said axis of said torsion mechanism locating shaft is allowed.

17. The vehicle of claim 16, wherein:

(a) said torsion mechanism is of a length which is less than one half of a width of said vehicle; and (b) said hood assist system is mounted and contained on one lateral half of said vehicle.

18. The vehicle of claim 17, wherein:

(a) said at least two torsion bar sections is comprised of at least three torsion bar sections;

(b) wherein one end of each of at least two of said at least three torsion bar sections is fixedly engaged to a first common rigid structural element; and (c) another end of each of said at least two of said at least three torsion bar sections is fixedly engaged to a second common rigid structural element such that said at least two of said at least three torsion bar sections behave as torsional springs in parallel between said first common rigid structural element and said second common rigid structural element.

19. The vehicle of claim 12, wherein:

(a) one end of each of at least two of said at least two torsion bar sections is fixedly engaged to a first common rigid structural element; and (b) another end of each of said at least two of said at least two torsion bar sections is fixedly engaged to a second common rigid structural element such that said at least two of said at least two torsion bar sections behave as torsional springs in parallel between said first common rigid structural element and said second common rigid structural element.

20. The vehicle of claim 12, wherein:

(a) one of said at least two torsion bar sections is tubular; and (a) another of said at least two torsion bar sections is disposed within said torsion bar section which is tubular.

* * * * *